United States Patent [19]

Sekhar et al.

[11] Patent Number: 5,217,583
[45] Date of Patent: Jun. 8, 1993

[54] COMPOSITE ELECTRODE FOR ELECTROCHEMICAL PROCESSING AND METHOD FOR USING THE SAME IN AN ELECTROLYTIC PROCESS FOR PRODUCING METALLIC ALUMINUM

[75] Inventors: Jainagesh A. Sekhar, Cincinnati, Ohio; Sarit B. Bhaduri, Moscow, Id.

[73] Assignee: University of Cincinnati, Cincinnati, Ohio

[21] Appl. No.: 648,165

[22] Filed: Jan. 30, 1991

[51] Int. Cl.$^5$ ................................................. C25C 3/08
[52] U.S. Cl. .................... 204/67; 204/243 R; 204/291; 252/503; 252/504; 252/507; 252/508; 252/509; 252/516; 252/519; 252/520; 252/521; 428/446; 428/689; 428/697; 428/698; 428/702; 428/688; 75/230; 75/232; 75/235; 75/236; 75/238; 75/243; 75/244; 75/246; 75/249

[58] Field of Search ...................... 204/243 R, 67, 291, 204/294; 75/230, 232, 235, 236, 238, 243, 244, 245, 246, 249; 252/503, 504, 507, 508, 509, 516, 519, 520, 521; 428/688, 689, 446, 697, 698, 702

[56] References Cited

U.S. PATENT DOCUMENTS

| | | | |
|---|---|---|---|
| 4,374,761 | 2/1983 | Ray | 204/67 |
| 4,405,433 | 9/1983 | Payne | 204/243 R |
| 4,699,763 | 10/1987 | Sinharoy et al. | 419/11 |
| 4,747,873 | 5/1988 | Kamioka | 75/243 |
| 4,909,842 | 3/1990 | Dunmead et al. | 75/236 |
| 4,948,676 | 8/1990 | Darracq et al. | 428/539.5 |
| 4,961,778 | 10/1990 | Pyzik et al. | 75/236 |
| 5,015,343 | 5/1991 | LaCamera et al. | 204/67 |

FOREIGN PATENT DOCUMENTS 0126555 11/1984 European Pat. Off. .
0192602  8/1986 European Pat. Off. .

OTHER PUBLICATIONS

M. B. Bevern (ed. in chief) "Encyclopedia of Materials Science" vol. 2, Pergamon Press (1986), pp. 1410–1414.
H. C. Yi et al Journal Materials Science, 25 (1990) pp. 1159–1168.
J. W. McCauley et al "Simultaneous Preparation ..." Ceramic Engineering, 3 (1982) pp. 538–554.
R. W. Rice et al "Effects of Self-Propogating ..." Ceramic Engineering, 7 (1986) pp. 737–749.

Primary Examiner—John Niebling
Assistant Examiner—Kathryn Gorgos
Attorney, Agent, or Firm—Frost & Jacobs

[57] ABSTRACT

A dimensionally stable combustion synthesis product of a composition containing at least 20% by weight of a particulate combustible material; at least 15% by weight of a particulate filler material capable of providing desired mechanical and electrical properties; and up to 35% by weight of a particulate inorganic binder having a melting point lower than the combustion synthesis temperature. Electrodes suitable for electrochemical processing are a preferred product form, particularly electrodes for use in the electrowinning of aluminum from its oxide.

23 Claims, No Drawings

COMPOSITE ELECTRODE FOR ELECTROCHEMICAL PROCESSING AND METHOD FOR USING THE SAME IN AN ELECTROLYTIC PROCESS FOR PRODUCING METALLIC ALUMINUM

BACKGROUND OF THE INVENTION

1. Field of the Invention

This invention relates to an electrode for use in electrochemical processing having improved mechanical and chemical properties in comparison to prior art electrodes used for the same purposes, which can be easily produced by combustion synthesis to form a core body having an interconnected network of a ceramic or metal-ceramic composite in which is uniformly dispersed a filler material providing desired electrochemical properties. Although not so limited, the invention has particular utility in the provision of an anode and a cathode for the electrowinning of aluminum from its ore in the Hall-Herault process. As is well known, this process involves electrolysis of molten cryolite-alumina at a temperature of about 1000° C.

2. Description Of The Prior Art

"Encyclopedia of Materials Science", Vol. 2, Michael B. Bever, ed. in chief, Pergamon Press, 1986, p. 1413, summarizes the state of the art relating to electrode materials for electrochemical processing, including electrochemical research, electrolytic production of hydrogen, chlorine, chlorates, perchlorates, electrowinning of aluminum, and other electrochemical processes. At page 1413, a discussion of the electrometallurgy of aluminum points out that electrolysis of a cryolite-alumina ($Na_3AlF_6 + Al_2O_3$) melt is carried out using a carbon anode and an aluminum cathode to yield aluminum on the basis of the reaction:

$$2Al_2O_3 + 3C \rightarrow 4Al + 3CO_2$$

Carbon dioxide is formed at the anode. The types of carbon anode presently used are described, and it is also pointed out that carbon is used as a cell lining in the reduction cell. Lining failure and anode consumption are recognized as being major disadvantages in the present process. The discussion relating to electrometallurgy of aluminum concludes with the following statement:

"A great deal of continued interest in discovering nonconsumable anodes for this process is stimulated by the need to have electrodes which eliminate the carbon consumption, save the labor of changing anodes and permit energy saving changes in cell designs such as bipolar configuration. Such materials must have high electronic conductivity and should not be attacked by oxygen and the molten cryolite. Also, they must be mechanically strong and resistant to thermal shock. Such anodes are not currently available although much research work is being carried out."

The use of combustion synthesis (CS), also referred to as self-propagating high-temperatures synthesis (SHS), for a variety of applications is reviewed by H. C. Yi et al, in *Journal Materials Science*. 25, 1159–1168 (1990). It is concluded that almost all of the known ceramic materials can be produced using the SHS method, in product forms including abrasives, cutting tools, polishing powders; elements for resistance heating furnaces; high-temperature lubricants; neutron attenuators; shape-memory alloys; high temperature structural alloys; steel melting additives; and electrodes for electrolysis of corrosive media. It is acknowledged that considerable research is needed, and major disadvantages arise in "achieving high product density and tight control over the reaction and products."

This article reports numerous materials produced by SHS and combustion temperatures for some of them, viz., borides, carbides, carbonitrides, nitrides, silicides, hydrides, intermetallics, chalcogenides, cemented carbides, and composites.

Combustion wave propagation rate and combustion temperature are stated to be dependent on stoichiometry of the reactants, pre-heating temperature, particle size and amount of diluent.

J. W. McCauley et al, in "Simultaneous Preparation and Self-Centering of Materials in the System Ti-B-C", *Ceramic Engineering and Science Proceedings*, 3, 538–554 (1982), describe SHS techniques using pressed powder mixtures of titanium and boron; titanium, boron and titanium boride; and titanium and boron carbide. Stoichiometric mixtures of titanium and boron were reported to react almost explosively (when initiated by a sparking apparatus) to produce porous, exfoliated structures. Reaction temperatures were higher than 2200° C. Mixtures of titanium, boron and titanium boride reacted in a much more controlled manner, with the products also being very porous. Reactions of titanium with boron carbide produced material with much less porosity. Particle size distribution of the titanium powder was found to have an important effect, as was the composition of the mixtures. Titanium particle sizes ranging from about 1 to about 200 microns were used.

R. W. Rice et al, in "Effects of Self-Propagating Synthesis Reactant Compact Character on Ignition, Propagation and Resultant Microstructure", *Ceramic Engineering and Science Proceedings*, 7, 737–749 (1986), describe SHS studies of reactions using titanium powders to produce TiC, $TiB_2$ or $TiC + TiB_2$. Reactant powder compact density was found to be a major factor in the rate of reaction propagation, with the maximum rate being at about $60 \pm 10\%$ theoretical density. Reactant particle size and shape were also reported to affect results, with titanium particles of 200 microns, titanium flakes, foil or wire either failing to ignite or exhibiting slower propagation rates. Particle size distribution of powdered materials (Al, BC, Ti) ranged from 1 to 220 microns.

U.S. Pat. No. 4,909,842, issued Mar. 20, 1990 to S. D. Dunmead et al, discloses production of dense, finely grained composite materials comprising ceramic and metallic phases by SHS combined with mechanical pressure applied during or immediately after the SHS reaction. The ceramic phase or phases may be carbides or borides of titanium, zirconium, hafnium, tantalum or niobium, silicon carbide, or boron carbide. Intermetallic phases may be aluminides of nickel, titanium or copper, titanium nickelides, titanium ferrides, or cobalt titanides. Metallic phases may include aluminum, copper, nickel, iron or cobalt. The final product is stated to have a density of at least about 95% of the theoretical density only when pressure is applied during firing, and comprises generally spherical ceramic grains not greater than about 5 microns in diameter in an intermetallic and/or metallic matrix.

U.S. Pat. No. 4,948,767, issued Aug. 14, 1990 to D. Darracq et al, discloses a ceramic/metal composite material, which may be used as an electrode in a molten salt electrolysis cell for producing aluminum, having at least one ceramic phase and at least one metallic phase, wherein mixed oxides of cerium and at least one of aluminum, nickel, iron and copper are in the form of a skeleton of interconnected ceramic oxide grains, the skeleton being interwoven with a continuous metallic network of an alloy or intermetalic compound of cerium with at least one of aluminum, nickel, iron and copper. The ceramic phase may include "dopants" for increasing its electrical conductivity and/or density. The dopants may comprise pentavalent elements such as tantalum and niobium, or rare earth metals. Inert reinforcing fibers or tissues may also be present. The method of production involves reactive sintering, reactive hot-pressing or reactive plasma spraying a precursor mixture containing a cerium oxide, fluoride and/or boride and/or at least one of aluminum, nickel, iron and copper. When used as an anode, the material is coated with a protective layer of cerium oxyfluoride. A significant disadvantage of the process disclosed in the patent arises when the constituents have widely different melting points, which makes sintering or hot pressing into a dimensionally stable product impossible. Plasma spray is a very limited technique which is unsuitable to form a large anode or similar product within a reasonable time. It is also recognized that sintering of oxide and non-oxide materials is rarely possible, and the interface bonding of materials by this technique may be inadequate for acceptable mechanical and electrical properties.

As is well known, the thermite reaction involves igniting a mixture of powdered aluminum and ferric oxide in approximately stoichiometric proportions which reacts exothermically to produce molten iron and aluminum oxide.

Despite the recognition of the disadvantages of prior art electrodes and the suggestion of the possibility of producing electrodes by CS, to the best of applicants' knowledge there has been no successful application of CS techniques in the production of net shaped composite electrodes for electrochemical processing which possess the required combination of properties.

In the process of the above-mentioned Dunmead et al patent, the application of pressure during firing (which is the only way to obtain a density of at least 95% of theoretical density) would destroy the die. Thus, a new die would be required for each net shaped article. In contrast to this, the present invention involves compaction before firing (without destruction of the die), and the requirement for application of pressure during or immediately after the SHS (or CS) reaction (in the Dunmead et al process) is avoided by use of a filler material which goes into a liquid phase during CS (or SHS).

Moreover, the Yi et al article acknowledged above does not recognize or suggest the possibility of making composite electrodes by CS wherein desired properties are achieved by uniform dispersal of filler material in a ceramic or metal-ceramic core body.

SUMMARY OF THE INVENTION

It is an object of the present invention to provide a composition for making a composite electrode suitable for electrochemical processing by combustion synthesis which is capable of providing desired electrochemical properties not available in prior art electrodes.

It is another object of the invention to provide a dimensionally stable combustion synthesis product having a shaped, interconnected network of a ceramic or metal-ceramic composite, and a filler material uniformly dispersed therein.

It is a further object of the invention to provide an electrode for electrochemical processing having improved corrosion and oxidation resistance at elevated temperatures, high electrical conductivity and high thermal conductivity.

It is still another object of the invention to provide a method of making a net shaped electrode suitable for electrochemical processing, by combustion synthesis.

It is a further object of the invention to provide an improved process for production of aluminum by electrolysis by the use of nonconsumable electrodes which minimize carbon consumption and formation of carbon dioxide.

According to the invention, there is provided a composition for making an electrode suitable for electrochemical processing by combustion synthesis, comprising at least 20% by weight of a particulate or fibrous combustible mixture which, when ignited, is capable of forming an interconnecting network of a ceramic or metal-ceramic composite; at least 15% by weight of a particulate or fibrous filler material capable of providing desired electrochemical properties; and up to about 35% by weight of a particulate or fibrous inorganic binder having a melting point lower than the combustion synthesis reaction temperature.

The invention further provides a dimensionally stable combustion synthesis product of a composition comprising at least 20% by weight of a particulate or fibrous combustible mixture which, when ignited, is capable of forming a ceramic or metal-ceramic composite; at least 15% by weight of a particulateor fibrous filler material capable of providing desired mechanical and electrical properties; and up to about 35% by weight of a particulate or fibrous inorganic binder having a melting point lower than the combustion synthesis reaction temperature; the product being a shaped, interconnected network of the ceramic or metal-ceramic composite in which the filler material is uniformly dispersed, and in which said binder, if present, is incorporated both into the network and the filler material.

There is further provided, in accordance with the invention, an electrode for electrochemical processing having improved corrosion and oxidation resistance at elevated temperatures, high electrical conductivity and high thermal conductivity; the electrode comprising at least 20% by weight of a ceramic composite or a metal-ceramic composite in the form of a dimensionally stable interconnected network, at least about 15% by weight of a filler material providing desired electrochemical properties; the filler material being uniformly dispersed in the network, and up to about 35% by weight of a binder phase associated with the network and with the filler material.

The invention also provides a method of making a net shaped electrode suitable for electrochemical processing, which comprises preparing a uniform mixture of (a) at least 20% by weight of a combustible powder which, when ignited, is capable of forming a ceramic or metal-ceramic composite, (b) at least about 15% by weight of a particulate or fibrous filler material capable of providing desired electrochemical properties, and (c) up to about 35% by weight of a particulate inorganic binder; compacting the mixture into the desired net shape in a die under a pressure of about 5 to about 15 ksi (about 3.5 to about 10.5 kg/mm$^2$); removing the net shape from the die; and igniting the mixture whereby to obtain a dimensionally stable composite electrode by combustion synthesis.

The invention further provides an improvement in a process for producing metallic aluminum by electrolysis of molten cryolite-alumina, by using nonconsumable electrodes which minimize carbon consumption and eliminate carbon dioxide emission at the anode, the electrodes comprising at least 20% by weight of a ceramic composite or a metal-composite in the form of a dimensionally stable interconnected network, at least about 15% by weight of a filler material providing improved corrosion and oxidation resistance at temperature up to about 1000° C., high electrical conductivity and high thermal conductivity,. the filler material being uniformly dispersed in the network, and up to about 35% by weight of a binder phase associated with the network and the filler material.

As indicated above, in the electrolysis of molten cryolite-alumina, carbon is generally used as the reducing agent and is supplied both from the carbon anode and from the carbon lining in the reduction cell, in the prior art process. If carbon is used as the reducing agent in the method of the present invention, it will be recognized that a carbon lining in the reduction call would be needed as the carbon source. However, consumption of the anode is eliminated in the method of the invention, and the overall consumption of carbon should thus be minimized. Moreover, the method of the invention could use a different reducing agent, thus further minimizing or even eliminating carbon consumption.

Electrodes in accordance with the invention and the process for making them offer flexibility in configuration, since incorporation of cooling channels and a bipolar configuration of anodes is easily obtained.

Improved mechanical strength and toughness is achieved in accordance with the invention by incorporation of fibrous reinforcing materials or other additives. High thermal shock resistance is obtained by choice of proper additives or by forming a porous structure.

Compositions useful in the practice of the invention encompass a wide range of combustible mixtures which, when ignited, form a ceramic or metal-ceramic composite interconnected network or core. Filler materials which provide desired electrochemical properties, can be selected from a variety of nitrides, oxides, borides, carbides, silicides, oxyfluorides, phosphides, metals, and/or carbon, dependent upon the particular electrochemical process for which the electrode is to be used.

DETAILED DESCRIPTION OF THE INVENTION

While preferred embodiments of the invention will be described with particular reference to an electrode for aluminum electrowinning, it will be recognized that the specific combination of properties required for such an electrode can be modified by appropriate selection of the composition of the combustible mixture, binder and filler material for other uses. The use of combustion synthesis is generic to all electrodes made in accordance with the invention.

The desired properties for electrodes for aluminum electrowinning are low reaction to molten cryolite in comparison to graphite; resistivity of 5-10 milliohm/cm; resistance to oxidation at temperatures of about 1000° C.; and adequate electrical conductivity at operating temperatures.

Composite electrodes in accordance with the invention exhibit the above properties. Moreover, combustion synthesis provides the only economical way in which to make such electrodes. In some instances, combustion synthesis is the only way of producing such products, e.g., where the constituents have very different melting points. In such cases, sintering by conventional techniques is not possible.

In a preferred composition for making an electrode in accordance with the invention, the combustible mixture may be from about 65% to about 95% titanium and remainder boron; from about 35% to about 55% metallic aluminum, about 25% to about 35% titanium dioxide, and about 20% to about 30% boric oxide; from about 65% to about 75% silicon and remainder graphite; from about 20% to about 30% metallic aluminum, about 20% to about 25% titanium dioxide, about 15% to about 25% boric oxide, and about 25% to about 30% zirconium oxide; from about 20% to about 30% metallic aluminum, about 20% to about 25% titanium dioxide, about 15% to about 25% boric oxide, and about 25% to about 35% metallic niobium; from about 20% to about 30% metallic aluminum, about 20% to about 25% titanium dioxide, about 15% to about 25% boric oxide, about 20% to about 25% aluminum oxide, and about 3% to about 10% zirconium oxide; about 30% titanium, about 20% boron, about 40% nickel, and about 10% phosphorus; about 50% titanium and about 50% graphite; and mixtures thereof; all percentages being by weight of the combustible mixture.

The binder in such a composition may be copper, titanium, silver, tin, iron, aluminum, cerium, lanthanum, misch metal, a low melting point oxide, or a ceramic eutectic, and mixtures thereof. The binder should have a melting point below the temperature of the CS reaction. In addition, the binder may act as a dopant to enhance the electrical conductivity of the ceramic composite.

Exemplary filler materials in a composition for making an electrode in accordance with the invention include aluminum nitride, lead oxide, ruthenium oxide, precious metal oxides, aluminum oxide, cerium oxide, lanthanum oxide, titanium dioxide, cerium oxyfluorides, boron nitride, silicon nitride, titanium nitride, titanium boride, zirconium boride, niobium boride, titanium carbide, hafnium carbide, boron carbide, silicon carbide, molybdenum silicide, titanium silicide, zirconium silicide, iron phosphide, aluminum phosphide, chromium phosphide, or carbon (graphite), and mixtures thereof.

It will be recognized that part of the combustible mixture defined above may also function, after ignition, as part of the filler material which provides desired electrochemical properties. A part of the binder may also function as a dopant for the ceramic composite.

All components of the composition are in particulate or fibrous form. When in particulate form, the components preferably have an average particle size of less than 44 microns (−325 mesh). Fibrous material may have an average diameter of less than 44 microns and an aspect ratio of at least 2:1.

The method of the present invention provides a net shaped electrode suitable for electrochemical processing. After compacting the uniform mixture into the desired net shape in a die under a pressure of about 5 to about 15 ksi, preferably about 7 ksi (about 4.9 kg/mm$^2$), the net shape mixture is removed from the die and ignited by means of an electric arc, electric spark, flame, microwave, welding electrode, laser or other conventional manner in order to initiate combustion synthesis. Since the components are mixed uniformly prior to compaction, the binder, when present, becomes part of both the interconnected ceramic or metal-ceramic network and the filler material. The binder provides continuity in the filler material and may also act as a dopant.

The ceramic composite obtained in the method of the invention may be chosen from the group consisting of oxides of lead, ruthenium, aluminum, rare earth metals, and titanium; nitrides of aluminum, boron, silicon, tantalum, titanium and other transition metals; borides of titanium, zirconium, niobium, tantalum, molybdenum, hafnium, chromium and vanadium; carbides of titanium, hafnium, boron, aluminum, tantalum, silicon, tungsten, zirconium, niobium and chromium; silicides of molybdenum, titanium, zirconium, niobium, tantalum, tungsten and vanadium; phosphides of iron, aluminum, chromium, titanium, nickel and niobium; and mixtures thereof.

Although not so limited, a metal-ceramic composite obtained in the method of the invention may be chosen from the group consisting of iron-aluminum oxide; aluminum-aluminum oxide-titanium boride; titanium-titanium boride; titanium-titanium boride-aluminum nitride; copper-aluminum oxide-titanium boride; copper-titanium carbide; nickel-titanium-nickel phosphide-titanium boride; cerium-titanium boride-rare earth metal oxides; and mixtures thereof.

In order to provide increased toughness and strength, the filler material may include at least in part a reinforcing material in fibrous form such as silicon carbide, graphite, a metal oxide, an elemental metal, a metal alloy, and mixtures thereof.

A preferred composition for making an electrode comprises a combustible mixture containing from about 25% to about 45% titanium, and about 10% to about 28% boron; about 15% to about 35% copper as an inorganic binder; and about 16% to about 50% aluminum nitride as a filler material; all percentages being by weight of the total composition. The filler material may include a minor amount of a dopant such as niobium or tantalum. Alternatively, a part of the binder may act as a dopant, e.g., where cerium oxide is a filler material and at least part of the binder is niobium and/or tantalum. Preferably the binder is from about 10% to about 25% by weight of the total composition.

In a more preferred composition, the combustible mixture comprises about 25% titanium and about 10% boron; the inorganic binder comprises about 15% copper; and the filler material comprises about 50% aluminum nitride.

Preferred exemplary compositions have been prepared as set forth in Table I. All components were in particulate form with an average particle size of less than 44 microns, i.e., passing 325 mesh. The components were mixed uniformly and compacted under pressures ranging from about 5 to about 15 ksi into net shapes suitable for electrical conductivity and resistivity tests, i.e., about 1.25 cm diameter by about 3.75 to about 5 cm in length. After ignition by means of a welding electrode, each resulting test specimen was a metal-ceramic composite containing TiB, TiB$_2$, Ti$_3$Cu, TiCu, Ti, and AlN.

The composition of Example 6 was compacted at 7 ksi, removed from the die, and ignited to form net shaped test specimens. Electrical resistivity properties were determined within the temperature range of 22° to 928° C. and are set forth in Table II. The voltage probe shorted at 930° C., so that higher readings were not obtained.

The data were obtained by taking 10 sets of current and voltage (knife blades) readings, after which the current was reversed and the procedure repeated. Averaged values of current "I" and voltage "E" were used to calculate the resistivity "$\rho$" from the relation $$\rho = \frac{E}{I} \frac{A}{L}$$

where A is the sample cross-sectional area and L is the distance between the knife blades. The averaged values were as follows:

| Current | Knife Blades |
|---|---|
| 2.0704646 | 0.0003524 |
| 2.0706749 | 0.0003617 |

Other data were as follows:
Probe length 0.6562 cm; area 0.5149 cm$^2$; sample perimeter 2.9312 cm; area/distance 0.78467 cm; RHO 0.13531 E$^{-03}$ ohm-cm.

Test specimens prepared from the composition of Example 6 were also subjected to tests for resistance to oxidation and resistance to molten cryolite, the latter test also being applied to a low density graphite for comparison.

In the oxidation resistance tests, a specimen of unrecorded dimensions was heated in air in a furnace for twenty-four hours at 1000° C. After heat treatment, the sample was of similar size, and the periphery showed an increase in porosity and some darkening. Sectioning showed little difference in optical microstructure from the original sample. It was thus concluded that oxidation resistance was adequate.

In the tests for resistance to molten cryolite, a specimen of 1.1 cm length was completed immersed in a molten mixture of 90% cryolite-10% alumina and heated for twenty-four hours at 1000° C. After heat treatment, the specimen had the same dimensions. The surface was black and displayed porosity. Small black particles were attached to the surface of the specimen. The specimen was subjected to scanning electron microscope and energy dispersive X-ray analysis and showed no significant changes in composition.

In a comparative test with low density graphite, a porous graphite specimen having a length of 0.8 cm was completely immersed in a molten 90% cryolite-10% alumina mixture and heated twenty-four hours at 1000° C. After the heat treatment, the graphite was completely destroyed.

Electrical conductivity of a test specimen of the composition of Example 6 was about 100.1 ohms cm at room temperature.

The superiority of the electrode of the present invention in comparison to a graphite electrode is believed to be clearly demonstrated by the above test data. The electrode of the invention also decreases carbon consumption and eliminates carbon dioxide emission, which problems characteristic of the conventional graphite electrode.

The process of the invention is also advantageous in permitting the incorporation of cooling channels in the net shaped electrode and bipolar configuration of anodes.

The process of the invention is further advantageous in permitting the formation of any desired coatings on an electrode. Coating materials may be applied after compaction to net shape, and during combustion enough heat is generated to ensure that the coating adheres to the electrode.

TABLE I

| | COMPOSITION BY WEIGHT PERCENT | | | | | | |
|---|---|---|---|---|---|---|---|
| | EXAMPLES | | | | | | |
| Components | 1 | 2 | 3 | 4 | 5 | 6 | 7 |
| titanium | 28.68 | 43.33 | 32.50 | 31.97 | 32.50 | 25.0 | 38.89 |
| boron | 27.20 | 23.33 | 17.50 | 17.21 | 17.50 | 10.0 | 16.67 |
| copper | 20.59 | 16.67 | 33.33 | 29.51 | 26.67 | 15.0 | 22.22 |
| aluminum nitride | 23.53 | 16.67 | 16.67 | 21.31 | 23.33 | 50.0 | 22.22 |
| | 100.00 | 100.00 | 100.00 | 100.00 | 100.00 | 100.0 | 100.00 |

TABLE II

| Electrical Resistivity | |
|---|---|
| Temp °C. | Resistivity Microohm · cm |
| 22 | 135.3 |
| 46 | 138.7 |
| 81 | 143.9 |
| 117 | 147.6 |
| 151 | 148.3 |
| 177 | 148.1 |
| 239 | 150.2 |
| 295 | 154.1 |
| 320 | 160.8 |
| 367 | 165.3 |
| 392 | 166.1 |
| 440 | 172.2 |
| 507 | 173.8 |
| 587 | 181.9 |
| 646 | 184.2 |
| 693 | 191.3 |
| 739 | 197.0 |
| 803 | 199.8 |
| 854 | 201.7 |
| 928 | 211.6 |

While the invention has been described above in relation to preferred embodiments, it is not so limited, and modifications apparent to those skilled in the art are considered to be within the scope of the invention.

We claim:

1. A composition for making a net-shaped electrode for electrochemical processing by combustion synthesis, comprising:
    as a reactant, at least about 20% by total weight of said composition, a particulate or fibrous ignitable and thenceforth self-propagating mixture which, when ignited, forms an interconnecting network of a ceramic composite, said reactant being selected from the group consisting of: from about 65% to about 95% titanium and remainder boron; from about 35% to about 55% metallic aluminum, about 25% to about 35% titanium dioxide, and about 20% to about 30% boric oxide; from about 65% to about 75% silicon and remainder graphite; from about 20% to about 30% metallic aluminum, about 20% to about 25% titanium dioxide, about 15% to about 25% boric oxide, and about 25% to about 30% zirconium oxide; from about 20% to about 30% metallic aluminum, about 20% to about 25% titanium dioxide, about 15% to about 25% boric oxide, and about 25% to about 35% metallic niobium; from about 20% to about 30% metallic aluminum, about 20% to about 25% titanium dioxide, about 15% to about 25% boric oxide, about 20% to about 25% aluminum oxide, and about 3% to about 10% zirconium oxide; about 30% titanium, about 20% boron, about 40% nickel, and about 10% phosphorus; about 50% titanium and about 50% graphite; and mixtures thereof; all percentages being by weight of the reactant; and as non-reactants, at least about 15% by weight of a particulate or fibrous filler material which provides desired electrochemical properties; and up to about 35% by weight of a particulate or fibrous inorganic binder having a melting point lower than the combustion synthesis reaction temperature, both said weights being based on the total weight of said composition.

2. The composition of claim 1, wherein said binder is copper, titanium, silver, tin, iron, aluminum, cerium, lanthanum, misch metal, a low melting point metal oxide, or a ceramic eutectic, and mixtures thereof.

3. The composition of claim 1, wherein said filler material is aluminum nitride, lead oxide, ruthenium oxide, precious metal oxides, aluminum oxide, cerium oxide, lanthanum oxide, titanium dioxide, cerium oxyfluoride, boron nitride, silicon nitride, titanium nitride, titanium boride, zirconium boride, niobium boride, titanium carbide, hafnium carbide, boron carbide, silicon carbide, molybdenum silicide, titanium silicide, zirconium silicide, iron phosphide, aluminum phosphide, chromium phosphide, or graphite, and mixtures thereof.

4. The composition of claim 1, wherein said combustible mixture, inorganic binder and filler material have an average particle size of less than 44 microns (−325 mesh).

5. The composition of claim 1, wherein said combustible mixture comprises from about 25% to about 45% titanium and about 10% to about 28% boron; said inorganic binder comprises from about 15% to about 35% copper; and said filler material comprises from about 16% to about 50% aluminum nitride; all percentages being by weight of the total composition.

6. The composition of claim 5, wherein said combustible mixture comprises about 25% titanium and about 10% boron; said inorganic binder comprises about 15% copper; and said filler material comprises about 50% aluminum nitride.

7. The composition of claim 1, wherein said filler material includes a fibrous reinforcing material chosen from the group consisting of silicon carbide, graphite, a metal oxide, an elemental metal, a metal alloy, and mixtures thereof.

8. The composition of claim 1, wherein part of said combustible mixture functions, after ignition, as part of said filler material providing desired electrochemical properties.

9. A dimensionally stable combustion synthesis product of a composition for making a net-shaped electrode comprising:

as a reactant, at least 20% by total weight of said compositions, a particulate or fibrous ignitable and thenceforth self-propagating mixture which, when ignited, forms a ceramic composite, said reactant being selected from the group consisting of: from about 65% to about 95% titanium and remainder boron; from about 35% to about 55% metallic aluminum, about 25% to about 35% titanium dioxide, and about 20% to about 30% boric oxide; from about 65% to about 75% silicon and remainder graphite; from about 20% to about 30% metallic aluminum, about 20% to about 25% titanium dioxide, about 15% to about 25% boric oxide, and about 25% to about 30% zirconium oxide; from about 20% to about 30% metallic aluminum, about 20% to about 25% titanium dioxide, about 15% to about 25% boric oxide, and about 25% to about 35% metallic niobium; from about 20% to about 30% metallic aluminum, about 20% to about 25% titanium dioxide, about 15% to about 25% boric oxide, about 20% to about 25% aluminum oxide, and about 3% to about 10% zirconium oxide; about 30% titanium, about 20% boron, about 40% nickel, and about 10% phosphorous; about 50% titanium and about 50% graphite; and mixtures thereof; all percentages being by weight of the reactant; and as non-reactants, at least 15% by weight of a particulate or fibrous filler material which provides desired mechanical and electrical properties; and up to about 35% by weight of a particulate or fibrous inorganic binder having a melting point lower than the combustion synthesis reaction temperature, both said weights being based on the total weight of said composition; said product being a shaped, interconnected network of said ceramic or metal-ceramic composite in which said filler material is uniformly dispersed, and in which said binder, if present is incorporated into said network and said filler material.

10. The product of claim 9, wherein said combustible mixture is chosen from the group consisting of:

from about 65% to about 95% titanium and remainder boron; from about 35% to about 55% metallic aluminum, about 25% to about 35% titanium dioxide, and about 20% to about 30% boric oxide; from about 65% to about 75% silicon and remainder graphite; from about 20% to about 30% metallic aluminum, about 20% to about 25% titanium dioxide, about 15% to about 25% boric oxide, and about 25% to about 30% zirconium oxide; from about 20% to about 30% metallic aluminum, about 20% to about 25% titanium dioxide, about 15% to about 25% boric oxide, and about 25% to about 35% metallic niobium; from about 20% to about 30% metallic aluminum, about 20% to about 25% titanium dioxide, about 15% to about 25% boric oxide, about 20% to about 25% aluminum oxide, and about 3% to about 10% zirconium oxide; about 30% titanium, about 20% boron, about 40% nickel, and about 10% phosphorus; about 50% titanium and about 50% graphite; and mixtures thereof; all percentages being by weight of the combustible mixture.

11. The product of claim 9, wherein said binder is copper, titanium, silver, tin, iron, cerium, lanthanum, misch metal, aluminum, a low melting point metal oxide, or a ceramic eutectic, and mixtures thereof.

12. The product of claim 9, wherein said filler material is aluminum nitride, lead oxide, ruthenium oxide, precious metal oxides, aluminum oxide, cerium oxide, lanthanum oxide, titanium dioxide, cerium oxyfluoride, boron nitride, silicon nitride, titanium nitride, titanium boride, zirconium boride, niobium boride, titanium carbide, hafnium carbide, boron carbide, silicon carbide, molybdenum silicide, titanium silicide, zirconium silicide, iron phosphide, aluminum phosphide, chromium phosphide, or graphite, and mixtures thereof.

13. A net shaped anode of the product of claim 9, for use in the electrowinning of aluminum from its oxide.

14. A net shaped cathode of the product of claim 9, for use in the electrowinning of aluminum from its oxide.

15. A dimensionally stable net-shaped electrode for electrochemical processing having improved corrosion and oxidation resistance at elevated temperatures, high electrical conductivity and high thermal conductivity, said electrode comprising:

at least 20% by total weight of said electrode, the reaction product of a particulate or fibrous, ignitable and thenceforth self-propagating, mixture which, when ignited forms a ceramic composite, said reaction product being selected from the group consisting of: from about 65% to about 95% titanium and remainder boron; from about 35% to about 55% metallic aluminum, about 25% to about 35% titanium dioxide, and about 20% to bout 30% boric oxide; from about 65% to about 75% silicon and remainder graphite; from about 20% to about 30% metallic aluminum, about 20% to about 25% titanium dioxide, about 15% to about 25% boric oxide, and about 25% to about 30% zirconium oxide; from about 20% to about 30% metallic aluminum, about 20% to about 25% titanium dioxide, about 15% to about 25% boric oxide, and about 25% to about 35% metallic niobium; from about 20% to about 30% metallic aluminum, about 20% to about 25% titanium dioxide, about 15% to about 25% boric oxide, about 20% to about 25% aluminum oxide, and about 3% to about 10% zirconium oxide; about 30% titanium, about 20% boron, about 40% nickel, and about 10% phosphorous; about 50% titanium and about 50% graphite; and mixtures thereof; all percentages being by weight of said reaction product, in the form of a dimensionally stable interconnected network; and as non-reactants, at least about 15% by weight of a particulate or fibrous filler material providing desired electrochemical properties, said filler material being uniformly dispersed in said network; and up to about 35% by weight of a particulate or fibrous binder phase associated with said network and said filler material, both said weights being based on the total weight of said electrode.

16. The electrode claimed in claim 15, wherein said binder phase is copper, titanium, silver, tin, iron, aluminum, cerium, lanthanum, misch metal, a low melting point metal oxide, or a ceramic eutectic, and mixtures thereof.

17. The electrode claimed in claim 15, wherein said filler material is aluminum nitride, lead oxide, ruthenium oxide, cerium oxide, lanthanum oxide, aluminum oxide, titanium dioxide, cerium oxyfluoride, boron nitride, silicon nitride, titanium boride, zirconium boride, niobium boride, titanium carbide, hafnium carbide, boron carbide, silicon carbide, molybdenum silicide, titanium silicide, zirconium silicide, iron phosphide, aluminum phosphide, chromium phosphide, or graphite, and mixtures thereof.

18. The electrode claimed in claim 15, wherein part of said ceramic composite or metal-ceramic composite functions as part of said filler material providing desired electrochemical properties.

19. The electrode claimed in claim 15, comprising titanium boride, titanium-copper intermetallic compounds, titanium, and aluminum nitride.

20. The electrode claimed in claim 15, wherein said filler material includes a reinforcing material in fibrous form chosen from the group consisting of silicon carbide, graphite, a metal oxide, an elemental metal, a metal alloy, and mixtures thereof.

21. An electrolytic cell for use in the electrowinning of aluminum from its oxide containing at least one electrode in accordance with claim 15.

22. In a process for producing metallic aluminum by electroylsis of molten cryolite-alumina, wherein the improvement comprises providing net shaped nonconsumable electrodes where at least one of the electrodes is an anode which minimize carbon dioxide production at the anode, said electrodes comprising:

at least 20% by total weight of each said electrode, a reaction product of a particulate or fibrous, ignitable and thenceforth self-propagating, mixture which, when ignited forms a ceramic composite, said reaction product being selected from the group consisting of: from about 65% to about 95% titanium and remainder boron; from about 35% to about 55% metallic aluminum, about 25% to about 35% titanium dioxide, and about 20% to about 30% boric oxide; from about 65% to about 75% silicon and remainder graphite; from about 20% to about 30% metallic aluminum, about 20% to about 25% titanium dioxide, about 15% to about 25% boric oxide, and about 25% to about 30% zirconium oxide; from about 20% to about 30% metallic aluminum, about 20% to about 25% titanium dioxide, about 15% to about 25% boric oxide, and about 25% to about 35% metallic niobium; from about 20% to about 30% metallic aluminum, about 20% to about 25% titanium dioxide, about 15% to about 25% boric oxide, about 20% to about 25% aluminum oxide, and about 3% to about 10% zirconium oxide; about 30% titanium, about 20% boron, about 40% nickel, and about 10% phosphorous; about 50% titanium and about 50% graphite; and mixtures thereof; all percentages being by weight of said reaction product, in the form of a dimensionally stable interconnected network; and as non-reactants, at least about 15% by weight of a filler material providing improved corrosion and oxidation resistance at temperatures up to about 1000° C., high electrical conductivity and high thermal conductivity, said filler material bing uniformly dispersed in said network, and up to about 35% by weight of a binder phase associated with said network and said filler material, both said weights being based on total weight of each said electrode.

23. The improvement of claim 22, wherein said electrodes have cooling channels therein and are arranged in a bipolar configuration.

* * * * *

UNITED STATES PATENT AND TRADEMARK OFFICE
CERTIFICATE OF CORRECTION

PATENT NO. : 5,217,583
DATED : JUNE 8, 1993
INVENTOR(S) : JAINAGESH A. SEKHAR & SARIT B. BHADURI

It is certified that error appears in the above—identified patent and that said Letters Patent is hereby corrected as shown below:

TITLE PAGE
In [73], Assignee, "University of Cincinnati, Cincinnati, Ohio", should read --Moltech Invent S.A., Luxembourg--

Signed and Sealed this

Twenty-fifth Day of October, 1994

Attest:

BRUCE LEHMAN

*Attesting Officer*  *Commissioner of Patents and Trademarks*